US005326614A

United States Patent [19]

Doose

[11] Patent Number: 5,326,614

[45] Date of Patent: Jul. 5, 1994

[54] CHIPPED WOOD SURFACING MATERIAL

[76] Inventor: Lawrence A. Doose, P.O. Box 190, Onamia, Minn. 56351

[21] Appl. No.: 69,984

[22] Filed: May 28, 1993

[51] Int. Cl.[5] ..................... B32B 5/12

[52] U.S. Cl. ..................... 428/107; 144/162 R; 144/369; 144/370; 144/3 R; 241/24; 241/28; 241/92; 428/106; 428/113; 472/92; 482/15; 482/35; 482/148

[58] Field of Search ..................... 241/24, 28, 73, 92; 482/15, 35, 148; 472/92; 428/106, 107, 113; 405/36; 144/1 R, 3 R, 162 R, 369, 370

[56] References Cited

U.S. PATENT DOCUMENTS

| | | | |
|---|---|---|---|
| 2,374,046 | 4/1945 | Stacom | 241/28 |
| 2,532,660 | 12/1950 | Care | 241/28 |
| 2,588,722 | 3/1952 | Hendershott | 482/15 |
| 2,869,793 | 1/1959 | Montgomery | 241/73 |
| 4,433,813 | 2/1984 | Whatton et al. | 241/28 |
| 4,435,085 | 3/1984 | Luthi et al. | 241/28 |
| 4,679,963 | 7/1987 | Heath | 405/36 |
| 4,991,834 | 2/1991 | Vaux | 472/92 |
| 5,097,879 | 3/1992 | Rice, Sr. | 144/176 |

OTHER PUBLICATIONS

R. B. Hadley, Identifying Wood: Accurate Results With Simple Tools (Taunton Press, Inc., Newtown, Conn. 1990), pp. 136–141.

A. J. Panshin and C. De Zeeuw, Textbook of Wood Technology, 3rd Ed. (McGraw.Hill, Inc. NY, 1970) pp. 546–549, 566–569, 602–603, 624, 625.

I. H. Isenberg, Puipwoods of the U.S. and Canada, vol. 2, 3rd Ed. (Institute of paper Chemistry, Appleton, Wis., 1981) pp. 161, 164, 212, 215.

Tinsworth, Deborah Kale, and John T. Kramer, *Playground Equipment-Related Injuries and Deaths*, U.S. Consumer Product Safety Commission, Washington, D.C. (Apr. 1990).

*Handbook for Public Playground Safety*, U.S. Consumer Product Safety Commission, Washington, D.C. (1991).

American Society for Testing Materials, *Standard Specification for Impact Attenuation of Surface Systems Under and Around Playground Equipment*, ASTM F1292 (Philadelphia, Pa., May 1991).

*Primary Examiner*—W. Donald Bray

*Attorney, Agent, or Firm*—Patterson & Keough

[57] ABSTRACT

Methods for producing a chipped wood surfacing material having unusually high shock absorbing capabilities are provided. The chipped wood is processed in order to give it a very high shock absorbing quality. This invention also relates to chipped wood having these unusually high shock absorbing characteristics.

17 Claims, 1 Drawing Sheet

CHIPPED WOOD SURFACING MATERIAL

FIELD OF THE INVENTION

This invention relates generally to the field of methods for producing a chipped wood surfacing material having unusually high shock absorbing capabilities. This invention also relates to chipped wood having unusually high shock absorbing characteristics.

BACKGROUND OF THE INVENTION

Children's playgrounds and other recreational areas present opportunities for physical activity and challenge. Such areas often have equipment such as swings, slides, climbing nets and ladders. Because children can be expected to use equipment in unintended and unanticipated ways, playground equipment and their surrounding fall zones should be as safe as possible. The fall zone is the area under and around the equipment where protective surfacing should be present. For example, the fall zone for a slide is at least six feet from the perimeter of the slide with a possible larger fall zone at the front exit of the slide chute, depending on the height of the slide.

The Consumer Product Safety Commission has long recognized the potential hazards that exist with the use of playground equipment. A Commission study of playground equipment-related injuries treated in U.S. hospital emergency rooms indicated that the majority of injuries resulted from falls from equipment. Tinsworth, Deborah Kale, and John T. Kramer, *Playground Equipment-Related Injuries and Deaths*, U.S. Consumer Product Safety Commission, Washington D.C. (April 1990). These injuries were primarily falls to the ground surface below the equipment rather than falls from one part of the equipment to another part of the equipment.

Several different surfacing materials are currently used in play areas. Examples of such surfacing materials include asphalt, concrete, hard packed dirt, grass and turf, unitary synthetic materials and loose-fill materials. Unitary synthetic materials are generally rubber mats or the like. Loose-fill materials are materials such as wood mulch, sand, gravel or shredded tires.

These various types of surfacing material have different degrees of shock absorbency. Obviously, a fall onto a hard surface is more likely to cause a serious injury than a fall onto a surface with a higher degree of shock absorbency. Head impact injuries from a fall on any kind of surface have the potential for being life threatening. The more shock absorbing a surface can be made, the less likely the injury will be severe or life threatening. It should be recognized, however, that depending on the circumstances of the fall, an injury may occur even if a highly shock absorbing surface material is used in a recreational area.

Biomedical researchers have developed a testing method to determine when a head impact injury may be life threatening. This test evaluates the shock absorbing properties of a recreational area surfacing material. The test is performed by dropping an instrumented metal headform onto a sample of the material and recording the acceleration/time pulse during the impact. Researchers have established that if the peak deceleration of the headform during impact does not exceed 200 times the acceleration due to gravity (200 g's), a life-threatening head injury is not likely to occur. *Handbook for Public Playground Safety*, U.S. Consumer Product Safety Commission, Washington D.C. (1991) (hereinafter "*Handbook for Public Playground Safety*").

The term "critical height" is used to describe the shock absorbing performance of a surfacing material. It is defined as the maximum height from which the instrumented metal headform, upon impact, yields a peak deceleration of no more than 200 g's when tested in accordance with the procedure described in American Society for Testing Materials, *Standard Specification for Impact Attenuation of Surface Systems Under and Around Playground Equipment*, ASTM F1292 (Philadelphia, Pa.; May 1991) (hereinafter "ASTM F1292").

Table 1 gives the critical heights for various surface materials. The tests were conducted in accordance with the ASTM F1292 procedure.

TABLE 1

Critical Heights (in feet) of Tested Materials

| Material | Uncompressed depth 6 inches | Uncompressed depth 9 inches | Uncompressed depth 12 inches | Compressed depth 9 inches |
|---|---|---|---|---|
| Wood mulch | 7 | 10 | 11 | 10 |
| Double shredded bark mulch | 6 | 10 | 11 | 7 |
| Uniform wood chips | 6 | 7 | >12 | 6 |
| Fine sand | 5 | 5 | 9 | 5 |
| Coarse sand | 5 | 5 | 6 | 4 |
| Fine gravel | 6 | 7 | 10 | 6 |
| Coarse gravel | 5 | 5 | 6 | 5 |

The Americans with Disabilities Act of 1990 ("ADA") prohibits discrimination on the basis of disability in employment, public services, transportation, telecommunications and public accommodations, including many services operated by private entities. 42 U.S.C. § 1210 et seq. It prohibits denying full and equal enjoyment of "goods, services, facilities, privileges, or accommodations" to disabled individuals with respect to any place open to the public. 42 U.S.C. § 12182. Existing structures, new construction, and alterations are all within the scope of the ADA's public accommodations provisions. Title III of the ADA includes within the definition of public accommodation: "a park, zoo, amusement park, or other place of recreation;" a school, including nursery schools; a day care center; and a gymnasium, health spa, or "other places of exercise or recreation." 42 U.S.C. § 12181. Public playgrounds, therefore, should be surfaced with a material so that physically challenged individuals may have access to playground equipment.

Hard surfacing material, such as asphalt or concrete allows recreational areas to be accessible to disabled individuals. These types of surfaces, however, are not otherwise suitable for use under and around playground equipment because of the high risk for injury due to a fall on the surface. Hard packed dirt is also not recommended because its shock absorbing properties can vary considerably depending on climatic conditions such as moisture content of the soil and temperature. It can be hazardous for children to play on very dry or frozen ground because of the lack of shock absorbance of these surfaces. Similarly, grass and turf are not recommended because their effectiveness in absorbing shock during a fall can be reduced considerably due to wear and environmental conditions. *Handbook for Public Playground Safety.*

Loose-fill materials such as sand and gravel are more shock absorbing than concrete or hard packed dirt, but these types of surfacing material have the disadvantage of inhibiting the maneuverability of wheelchairs, walkers, tricycles, bicycles, strollers and other wheeled items. Wheeled vehicles cannot easily move across sand and gravel. Further, the critical height values for sand and gravel materials decrease when the materials are compressed. Such compression can be expected from repeated use in high traffic areas of the playground. Also, moisture in sand can cause the critical height value for this material to decrease.

A disadvantage of unitary materials is that the material itself is very expensive. Unitary materials can be as much as ten times more expensive than the inventive surfacing material. Also, the ground underneath the synthetic material often must be made level and uniform before the unitary material is laid, which can be costly process. Further, this type of material may not drain well after storms because of puddles that may form on the surface. Another disadvantage is that synthetic materials can leach chemicals into the environment.

SUMMARY OF THE INVENTION

The present invention is a novel and useful method for producing a chipped wood surfacing material having unusually high shock absorbing capability. This invention also relates to chipped wood having unusually high shock absorbing capabilities.

The invention is practiced by first harvesting trees of the Family Salicaceae, genus Populus. The harvested trees are de-limbed to form poles. The poles are processed through a knife type chipper to form wood chips. Next, the wood chips are shredded and passed through a screen with a pore size of about one inch in diameter to form wood particles. Random samples of the resulting wood particles are tested to verify that the wood particles have a critical height of at least 8 feet at an uncompressed depth of 6 inches.

The trees used as starting materials in the invention can be of the aspen or popple species. The resulting wood particles may be used as a surface material for recreational areas such as playgrounds, biking trails, hiking trails and the like. The wood particles may also be used as a surface material on other paths such as between buildings on college campuses or in business parks or at exercise facilities.

The present invention also includes manufactured wood particles with the property of a critical height of at least 8 feet at an uncompressed depth of 6 inches. The wood particles are derived from the Family Salicaceae, genus Populus. The wood particles may be derived from the aspen or popple species.

DETAILED DESCRIPTION

Figure 1:
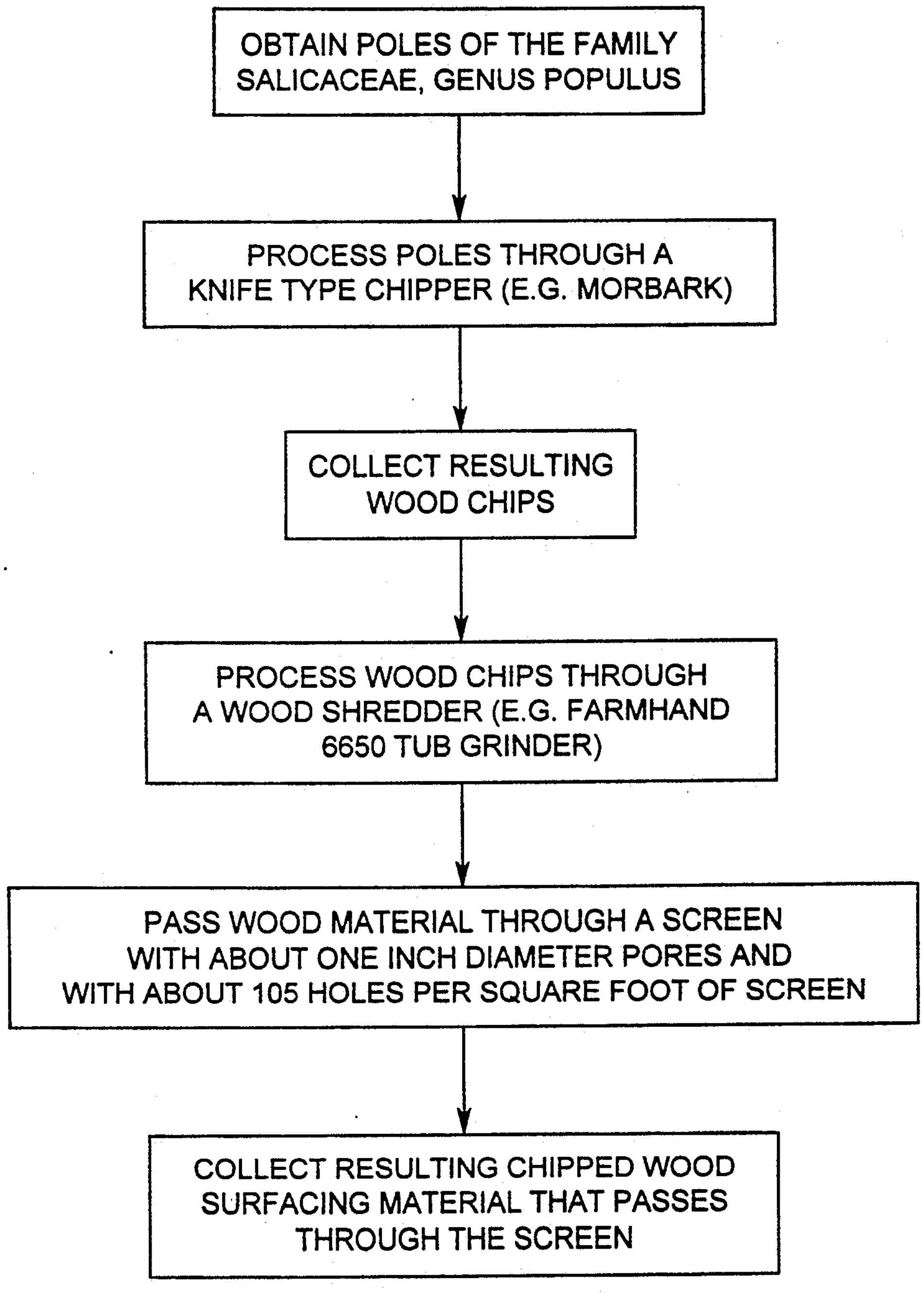
FIG. 1 is a flow diagram of the method of the present invention.

Trees of the Family Salicaceae (commonly called the willow or poplar Family), of the genus Populus are harvested and de-limbed to form poles. Preferably the trees are of the aspen or popple species. The poles preferably are less than about 22 inches in diameter and are processed through a knife type chipper that produces pieces of wood that will break fairly easily. The chips are further processed through a grinder/shredder until the chips are small enough to pass through a screen of a designated size. The shredding process produces a mixture of wood chips and wood particles of various sizes. Further, the shredding process introduces extrinsic air into the individual wood chips or particles. Random samples of the chipped wood are tested to verify that the wood product has a critical height of at least 8 feet at an uncompressed depth of about 6 inches.

This particular shredding process produces the unique characteristic that gives the chipped wood surfacing material its superior test results. A hammering process carried out by the grinder/shredder produces a chip that is "fluffy," a result of the bonding between the fibers in the chip being loosened but not separated, allowing air to be trapped within the chips. The shredding process separates the wood fibers on the ends of the chips, producing more trapped air between the individual particles.

The chipped wood surfacing material of this invention is suitable to be spread on playgrounds such as at schools, public parks or child care centers. The surfacing material of this invention is also suitable for spreading on paths including but not limited to bicycle trails, nature trails, hiking trails and walking paths. These paths, for example, may be in public parks or forests, college campuses, business parks, private settings or areas that are within the scope of the ADA's public accommodations provisions.

The chipped wood surfacing material is not treated with any chemicals and therefore is completely non-toxic and is an environmentally sound surfacing material. The invention is superior to asphalt or concrete because is never expands or contracts during the changing seasons. It does not generate buckles or cracks that must be patched or repaired. Further, it is more resilient than sand or gravel. The invention provides a suitable surface for wheelchairs, walkers, crutches, tricycles, bicycles and strollers because wheeled vehicles can easily move over the inventive material.

The invention will be further understood with reference to the following illustrative embodiments, which are purely exemplary, and should not be taken as limiting the true scope of the present invention as described in the claims.

EXAMPLE 1

Manufacture of Chipped Wood Surfacing Material

Trees of the aspen species were harvested and delimbed to form poles. The poles were less than about 22 inches in diameter and were processed through a knife type chipper (Morbark) to form wood chips. The wood chips were about two to six millimeters (0.079 to 0.236 inches) thick and about 15.9 to 25.4 millimeters (⅝ to 1 inch) long.

Next, the wood chips were processed through a grinder/shredder (Farmhand 6650 Tub Grinder). The grinder was equipped with a rotor 21 inches in diameter and 40 inches long. The rotor held 40 hammers, each 0.5 inch thick, 2.75 inches wide, and 5 inches long. The rotor turns at a speed of 2175 RPM. The hammers shredded the wood chips until they passed through a screen with 1 inch diameter holes spaced 1.25 inches from center to center with 105 holes per square foot of screen.

The shredding process, followed by passage through the above-referenced screen, produced a mixture of wood particles of varying sizes. Representative samples were tested according to American Society of Testing Materials Test Method C136 using a Gilson Testmaster model TM-4 Sieve Shaker. The samples were shaken for seven minutes and the results were obtained by weighing retained gradient in each sieve. The results are given in Table 2.

TABLE 2

Particle Sizes of Chipped Wood Surfacing Material

| Particle size | Percentage of sample |
|---|---|
| Particles passed through ¾" sieve, but retained on ½" sieve | 3% |
| Particles passed through ½" sieve, but retained on ⅜" sieve | 10% |
| Particles passed through ⅜" sieve, but retained on ¼" sieve | 58% |
| Particles passed through ¼" sieve, but retained on ⅛" sieve | 22% |
| Particles passed through ⅛" sieve, but retained on pan | 7% |

Random samples of the chipped wood were collected and tested to verify that the wood product had a critical height of at least 8 feet at an uncompressed depth of about 6 inches. The test procedure used is given in Example 2 below.

EXAMPLE 2

Test Method to Determine Critical Height Values

Representative samples of the surfacing material were tested according to Test Method F 355, Procedure C (metal headform) at various drop heights and test temperatures as set forth in *Standard Specification for Impact Attenuation of Surface Systems Under and Around Playground Equipment*, American Society for Testing and Materials (May 1991). This test method determined the maximum drop height at which the g-max did not exceed 200. The symbol "g" represents the acceleration into gravity at the earth's surface at sea level; g equals 32 ft/s or 9.8 m/s. The g-max is the multiple of g that represents a maximum deceleration experienced during an initial impact.

A six inch depth of the chipped wood surfacing material was placed in an 18"×18" box for the testing. A "C" size headform with an accelerometer (Endevco Accelerometer, Model 2215) mounted at its center was used in the tests. Impact acceleration data were obtained at drop heights of 10, 11 and 12 feet. The headform was oriented such that the impact surface was its crown.

The impact tests consisted of three drops at the same impact site at each of several different heights. The average of the second and third drop at each height yielded the recorded impact acceleration value. A new chipped wood sample was used for each set of drops. The impact test samples were tested at the three specific temperatures of 30° F., 72° F. and 120° F. (−1°, 23° and 49° C. respectively) after the required temperature equilibration. Table 3 gives the Critical Height values for the invention.

TABLE 3

Critical Heights (in feet) of Tested Chipped Wood Surfacing Material

| Temperature (°F.) | Thickness (inches) | Drop height (feet) | Impact acceleration (g's) |
|---|---|---|---|
| 30 | 6 | 10 | 175.1 |
| 30 | 6 | 11 | 171.2 |
| 30 | 6 | 12 | 172.2 |
| 72 | 6 | 10 | 151.8 |
| 72 | 6 | 11 | 177.6 |
| 72 | 6 | 12 | 201.2 |
| 120 | 6 | 10 | 157.3 |
| 120 | 6 | 11 | 170.9 |
| 120 | 6 | 12 | 178.9 |

The average of the second and third impact accelerations at an 11 foot drop height did not exceed 200 g's at the three test temperatures. Therefore, the invention has a critical height of 11 feet at a depth of 6 inches at all temperatures tested. This is at least four feet higher than the highest critical height of materials reported by the U.S. Consumer Products Safety Commission in its 1991 *Handbook for Public Playground Safety.*

The foregoing detailed description has been provided for a better understanding of the invention only and no unnecessary limitation should be understood therefrom as some modifications will be apparent to those skilled in the art without deviating from the spirit and scope of the appended claims.

I claim:

1. A method of manufacturing a chipped wood surfacing material, comprising the steps of:

processing poles of the Family Salicaceae, genus Populus through a knife type chipper to from wood chips comprising a plurality of wood fibers;

shredding said wood chips under conditions sufficient to loosen but not separate the bonding between said fibers in said chips and to entrap extrinsic air between said wood fibers; and passing said wood chips through a screen with a pore size of about one inch in diameter to form a plurality of wood particles having, in aggregate, a critical height of at least 8 feet at an uncompressed depth of 6 inches at any outdoor temperature.

2. The method of claim 1, wherein said wood is of the aspen species.

3. The method of claim 1, wherein said wood is of the popple species.

4. The method of claim 1, wherein said critical height is at least 10 feet.

5. The method of claim 1 wherein said critical height is at least 11 feet.

6. Chipped wood surfacing material generated by the method comprising the steps of:

harvesting trees of the Family Salicaceae, genus Populus;

de-limbing said trees to form poles;

processing said poles through a knife type chipper to form wood chips comprising a plurality of wood fibers;

shredding said wood chips under conditions sufficient to loosen but not separate the bonding between said fibers in said chips and to entrap extrinsic air between said wood fibers; and passing said wood chips through a screen with a pore size of about one inch in diameter to form a plurality of wood particles having, in aggregate, a critical height of at least 8 feet at an uncompressed depth of 6 inches at any outdoor temperature.

7. The chipped wood surfacing material of claim 6, wherein said wood is of the aspen species.

8. The chipped wood surfacing material of claim 6, wherein said wood is of the popple species.

9. The chipped wood surfacing material of claim 6, wherein said critical height is at least 10 feet.

10. The chipped wood surfacing material of claim 6, wherein said critical height is at least 11 feet.

11. Chipped wood surfacing material comprising chipped wood of the genus Populus, said chipped wood having loosened but not separated wood fibers and having extrinsic air trapped between said fibers, said chipped wood surfacing material having a critical height of at least 8 feet at any outdoor temperature.

12. The chipped wood surfacing material of claim 11 with a critical height of at least 10 feet.

13. The chipped wood surfacing material of claim 11 with a critical height of at least 11 feet.

14. The chipped wood surfacing material of claim 11 wherein said material is derived from wood chips of the aspen species.

15. The chipped wood surfacing material of claim 11 wherein said material is derived from wood chips of the popple species.

16. A method of surfacing a recreational area, comprising spreading the chipped wood surfacing material of claim 11 on said recreational area.

17. A method of surfacing a path, comprising spreading the chipped wood surfacing material of claim 11 on said path.

* * * * *